United States Patent
Li et al.

(10) Patent No.: US 9,094,271 B2
(45) Date of Patent: *Jul. 28, 2015

(54) METHOD AND APPARATUS FOR REDUCING MUTUAL INTERFERENCE OF MULTI-CARRIER

(75) Inventors: Fanlong Li, Shenzhen (CN); Wenzhong Bi, Shenzhen (CN); Jinming Lao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 690 days.

This patent is subject to a terminal disclaimer.

(21) Appl. No.: 13/258,330
(22) PCT Filed: Dec. 23, 2009
(86) PCT No.: PCT/CN2009/075905
§ 371 (c)(1), (2), (4) Date: Feb. 8, 2012
(87) PCT Pub. No.: WO2011/017883
PCT Pub. Date: Feb. 17, 2011

(65) Prior Publication Data
US 2012/0122445 A1    May 17, 2012

(30) Foreign Application Priority Data
Aug. 8, 2009  (CN) .......................... 2009 1 0165245

(51) Int. Cl.
*H04W 4/00* (2009.01)
*H04L 27/26* (2006.01)
(Continued)

(52) U.S. Cl.
CPC ........... *H04L 27/2637* (2013.01); *H04J 11/003* (2013.01); *H04L 25/03343* (2013.01); *H04L 25/03821* (2013.01); *H04L 2025/03414* (2013.01); *H04L 2025/03445* (2013.01)

(58) Field of Classification Search
CPC ............. H04J 11/003; H04L 25/03343; H04L 27/2637; H04L 2025/03445
USPC .......................... 455/422.1; 370/203; 375/260
See application file for complete search history.

(56) References Cited

U.S. PATENT DOCUMENTS

| | | |
|---|---|---|
| 4,939,751 A | 7/1990 | Kuroda |
| 7,010,048 B1 | 3/2006 | Shattil |

(Continued)

FOREIGN PATENT DOCUMENTS

| | | |
|---|---|---|
| CN | 1296684 A | 5/2001 |
| CN | 1514555 A | 7/2004 |

(Continued)

OTHER PUBLICATIONS

International Search Report on international application No. PCT/CN2009/075905, mailed on Dec. 23, 2009.

(Continued)

*Primary Examiner* — Shahriar Behnamian
(74) *Attorney, Agent, or Firm* — Oppedahl Patent Law Firm LLC

(57) ABSTRACT

The disclosure discloses a method for reducing mutual interference of multi-carrier, comprising: adjusting the delay of at least one modulation signal; respectively modulating each adjusted modulation signal onto each modulated signal; and comparing the performance indices of modulated signals with set performance indices, wherein the delay of at least one modulation signal is adjusted when the set performance indices are not reached, until the performance indices of modulated signals reach the set performance indices, and each current modulated signal is set as an output signal, or each current modulation signal is set as an input signal when the set performance indices are reached. The disclosure further discloses an apparatus for reducing mutual interface of multi-carrier. The disclosure can improve the performance obviously under the circumstance of arranging the multi-carrier adjacent to each other, and enable the multiple carriers to operate simultaneously in the coverage area of one radio signal, thereby greatly improving the frequency spectrum utilization ratio.

26 Claims, 5 Drawing Sheets

(51) Int. Cl.
*H04J 11/00* (2006.01)
*H04L 25/03* (2006.01)

(56) References Cited

U.S. PATENT DOCUMENTS

| | | | |
|---|---|---|---|
| 7,076,168 B1 * | 7/2006 | Shattil | 398/76 |
| 7,443,782 B2 | 10/2008 | Yang et al. | |
| 7,522,900 B2 | 4/2009 | Allott et al. | |
| 7,873,117 B2 * | 1/2011 | Fukuoka et al. | 375/295 |
| 8,243,834 B2 * | 8/2012 | Kishigami et al. | 375/260 |
| 8,699,954 B2 * | 4/2014 | Bi et al. | 455/63.1 |
| 2002/0160738 A1 | 10/2002 | Allott et al. | |
| 2004/0146122 A1 | 7/2004 | Fague et al. | |
| 2004/0151254 A1 | 8/2004 | Yang et al. | |
| 2009/0103648 A1 | 4/2009 | Fukuoka et al. | |
| 2009/0175367 A1 | 7/2009 | Kishigami et al. | |

FOREIGN PATENT DOCUMENTS

| | | |
|---|---|---|
| CN | 101185269 A | 5/2008 |
| CN | 101361307 A | 2/2009 |
| CN | 101404509 A | 4/2009 |
| CN | 101453257 A | 6/2009 |
| EP | 1435713 A2 | 7/2004 |
| EP | 1881629 A1 | 1/2008 |
| JP | 2005192000 A | 7/2005 |
| JP | 2008211414 A | 9/2008 |
| RU | 2282944 C2 | 8/2006 |

OTHER PUBLICATIONS

English Translation of the Written Opinion of the International Search Authority in international application No. PCT/CN2009/075905, mailed on Dec. 23, 2009.

English Translation of the Written Opinion of the International Search Authority in international application No. PCT/CN2009/075906, now U.S. Patent No. 8,699,954, mailed on May 20, 2010.

International Search Report in international application No. PCT/CN2009/075906, now U.S. Patent No. 8,699,954, mailed on May 20, 2010.

* cited by examiner

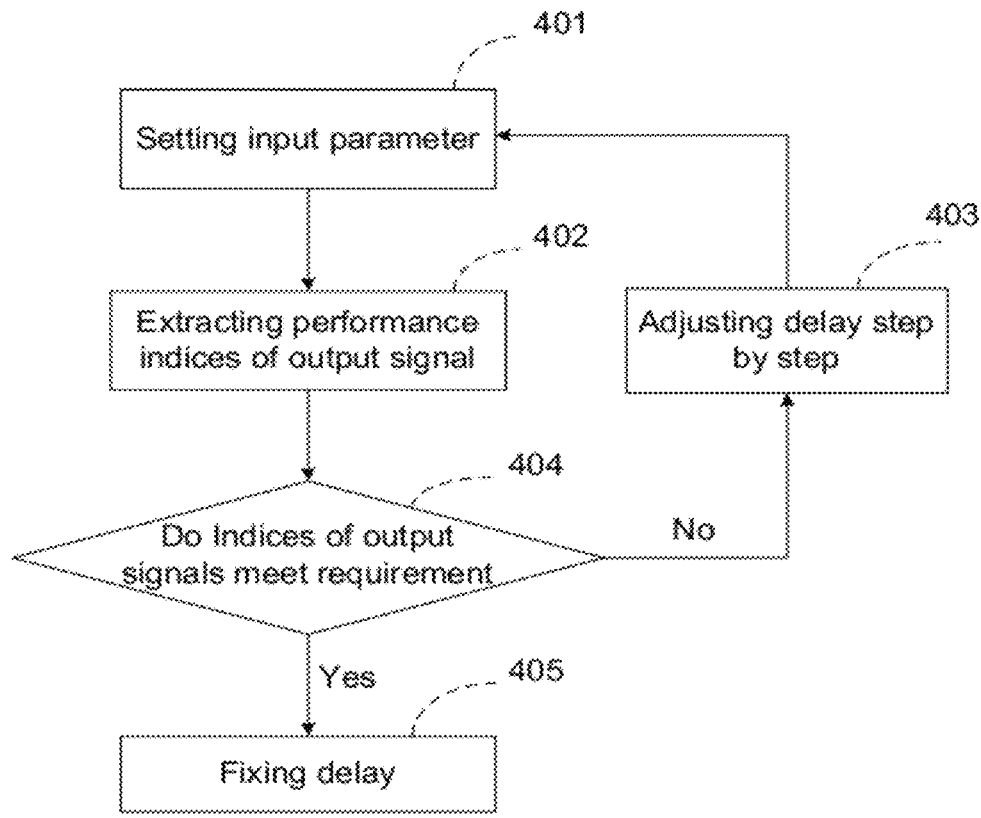
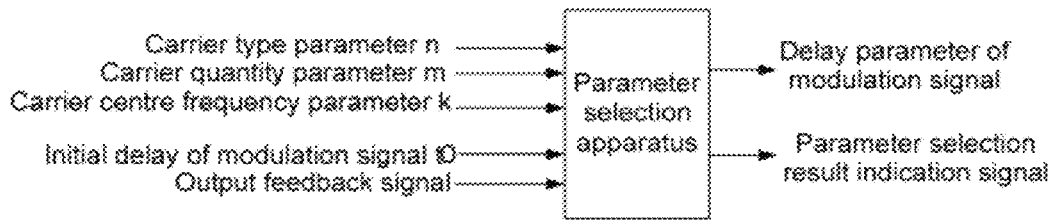

METHOD AND APPARATUS FOR REDUCING MUTUAL INTERFERENCE OF MULTI-CARRIER

TECHNICAL FIELD

The present disclosure relates to the processing technology of multi-carrier mutual interference in communication system, particularly to a method and an apparatus for reducing mutual interference of multi-carrier.

BACKGROUND

At present, most of wireless communication systems can support multi-carrier operating mode. Under the multi-carrier operating mode, the carrier signals transmitted and received by related network elements are all the combined carriers of a plurality of single carriers. For example, for a CDMA2000 lx communication system in 800 MHz frequency band, the bandwidth of single carrier is 1.23 MHz, the is centre frequency interval of adjacent carriers is 1.23 MHz, a combined carrier with an occupied bandwidth of about 3.69 MHz is formed by three single carriers each with a bandwidth of 1.23 MHz together when a plurality of carriers, such as three carriers, are arranged adjacent to each other, and the centre frequencies of the three carriers are respectively set to be 871.11 MHz, 872.34 MHz and 873.57 MHz (which also can be other frequencies). FIG. 1 is a diagram of carrier interference of three carriers with adjacent frequency domains in a Code Division Multiple Access (CDMA) system. As shown in FIG. 1, the frequency of the first carrier is 871.11 MHz, the frequency of the second carrier is 872.34 MHz, and the frequency of the third carrier is 873.57 MHz. In multi-carrier mode, partial information of a carrier is aliased in adjacent carrier, that is, the mutual interference of multi-carrier appears, and the interference is particularly obvious when the carriers are arranged adjacent to each other. As shown in FIG. 1, two shadow regions are the aliasing regions of the carriers, that is, partial information of the first carrier is aliased in the second carrier, and simultaneously partial information of the second carrier is aliased in the first carrier. The second carrier and the third carrier also have the similar circumstance. When the information of another carrier is aliased in a carrier, the partial information could become an interference to influence the quality of the signal. Owing to the existence of such interference, it is highly likely that the receiver at the receiving end cannot demodulate signals correctly. Such interference has particularly prominent influence on the Evolution-Data Optimized (EV-DO) signal in the CDMA system. Certainly, a similar problem of multi-carrier interference also exists in Wideband Code Division Multiple Access (WCDMA), Time Division-Synchronous Code Division Multiple Access (TD-SCDMA) and other systems.

In multi-carrier wireless communication system, particularly under multi-carrier EV-DO communication mode in a CDMA system, in order to guarantee the communication quality, the influence of inter-carrier interference has to be reduced. At present, no solution is available to solve the mutual interference of a plurality of adjacent carriers in a wireless communication system, particularly under multi-carrier EV-DO communication mode in a CDMA system.

SUMMARY

In view of this, a main object of the disclosure is to provide a method and an apparatus for reducing mutual reference of multi-carrier, which can obviously reducing the mutual reference of multiple carriers with adjacent carrier frequencies.

To solve the problem above, the technical solutions of the disclosure are provided below.

A method for reducing mutual reference of multi-carrier is provided, which comprises:

adjusting a delay of at least one modulation signal;

modulating each adjusted modulation signal onto respective modulated signal; and comparing performance indices of modulated signals with set performance indices, and adjusting the delay of at least one modulation signal when the set performance indices are not reached, until the performance indices of modulated signals reach the set performance indices, and setting each current modulated signal as an output signal when the set performance indices are reached.

Preferably, the step of adjusting the delay of at least one modulation signal comprises: adjusting simultaneously the delay of the modulation signal of each carrier.

Preferably, the step of adjusting the delay of at least one modulation signal comprises: adjusting the modulation signals of each carrier in sequence.

Preferably, when the modulation mode of the modulation signal is cascade modulation, the delay of the corresponding modulation signal is adjusted progressively beginning from the corresponding modulation signal of the first level modulation until the performance indices of modulated signals output in the last level reach the set performance indices, and each modulated signal determined in each modulation is set as an output signal.

Preferably, the performance indices of the signal comprise at least one of the specific value MAX IT of carrier unactivated code channel maximum power and activated code channel total power, and waveform quality Rho.

Preferably, the performance indices of the signal comprise whether each modulated signal to be correct; when incorrect modulated signals exist, the delay of at least one modulation signal in the modulation signals is continuously adjusted; when all modulated signals are correct, each current modulation signal is set as an input baseband signal.

A method for reducing mutual interference of multi-carrier is provided, which comprises:

adjusting a delay of at least one modulation signal;

modulating each adjusted modulation signal onto respective modulated signal; and comparing performance indices of modulated signals with set performance indices, and adjusting the delay of at least one modulation signal is adjusted when the set performance indices are not reached, until the performance indices of modulated signals reach the set performance indices, and setting each current modulated signal as an input signal when the set performance indices are reached.

An apparatus for reducing mutual interference of multi-carrier is provided, which comprises an adjusting unit, a modulating unit, a performance index determining unit, a comparing unit and a determining unit, wherein:

the adjusting unit is configured to adjust a delay of at least one modulation signal;

the modulating unit is configured to modulate each adjusted modulation signal onto respective modulated signal;

the performance index determining unit is configured to determine performance indices of modulated signals;

the comparing unit is configured to compare the performance indices of modulated signals with set performance indices, and trigger the adjusting unit to further adjust the delay of at least one modulation signal in the modulation signals when the set performance indices are not reached, and trigger the determining unit when the set performance indices are reached; and the determining unit is configured to set each current modulated signal as an output signal.

Preferably, the adjusting unit simultaneously adjusts the delay of the modulation signal of each carrier.

Preferably, the adjusting unit adjusts the modulation signals of each carrier in sequence.

Preferably, when the modulation mode of the modulation signal is cascade modulation, the adjusting unit adjusts the delay of the corresponding modulation signal progressively beginning from the corresponding modulation signal of the first level modulation until the performance indices of modulated signals output in the last is level reach the set performance indices, and the determining unit sets each modulated signal determined in each modulation as an output signal.

Preferably, the performance indices of the signal comprise at least one of the specific value MAX IT of carrier inactivated code channel maximum power and activated code channel total power, and waveform quality Rho.

Preferably, the apparatus further comprises a demodulating unit configured to demodulate the modulated signals, wherein the performance indices of the signal further comprise whether the modulation signal demodulated by the demodulating unit to be correct, the adjusting unit further adjusts the delay of at least one modulation signal in the modulation signals when there is a modulation signal which cannot be demodulated correctly, and the determining unit sets each current modulation signal as an input baseband signal when all modulation signals are demodulated correctly.

An apparatus for reducing mutual interference of multi-carrier is provided, which comprises an adjusting unit, a modulating unit, a performance index determining unit, a comparing unit and a determining unit, wherein:

the adjusting unit is configured to adjust a delay of at least one modulation signal;

the modulating unit is configured to modulate each adjusted modulation signal onto each signal to be modulated;

the performance index determining unit is configured to determine performance indices of modulated signals;

the comparing unit is configured to compare the performance indices of modulated signals with set performance indices, and trigger the adjusting unit to further adjust the delay of at least one modulation signal in the modulation signals when the set performance indices are not reached, and trigger the determining unit when the set performance indices are reached; and the determining unit is configured to set each current modulated signal as an input signal.

With the above technical solution, the present disclosure has the following advantages: it may satisfactorily solve the mutual interference of multi-carrier signals in a wireless communication system, particularly the mutual interference of multi-carrier EV-DO signals in a CDMA system. The present disclosure can improve the performance obviously under the circumstance of arranging the multi-carrier adjacent to each other, and enable multiple carriers to operate simultaneously in coverage area of one radio signal, therefore the frequency spectrum utilization ratio is greatly improved, the flexibility of wireless planning is enhanced, the traffic capacity of cells, transmission rate and service quality are improved, and the user experience is improved.

BRIEF DESCRIPTION OF THE DRAWINGS

FIG. 4 shows a flowchart of a method for reducing mutual interference of multi-carrier in the disclosure;

FIG. 5 shows a structural diagram of a parameter selection apparatus in the disclosure;

DETAILED DESCRIPTION

Basic concept of the disclosure is that: mutual interference is serious in the multi-carrier system, particularly among the carriers with adjacent frequency domains. Through adjusting the delay of the modulation signal input on each carrier, the present disclosure enables the performance indices of the modulated signal corresponding multi-carrier reach the set performance indices. The solution of the disclosure is easy to realize and practical.

The present disclosure will be described in details below in conjunction with embodiments and accompanying drawings, to make its objects, technical solutions and advantages more clear.

In the modern wireless communication system, the transmitting signal is realized by modulating information that is the modulation signal onto modulated signal. The modulated signal can be generated by an apparatus such as Numerical Control Oscillator (NCO) or simulative generator. The modulation process can be completed by a modulator, which may be various types of modulators such as a real number modulator, a complex number modulator and an orthogonal modulator. The modulation signal can be expressed as:

$$X(t+t_0)=A(t+t_0)+j*B(t+t_0);$$

where $t_0$ represents fixed delay. If the modulated signal is a real number, only the real part in $X(t+t_0)$ is needed.

In a conventional multi-carrier wireless communication system, the inter-carrier interference is reduced only through appointing the frequency of the modulated signal input in the modulator other than appointing the delay $t_0$ of each modulation signal. In the disclosure, the delay $t_0$ of each modulation signal is set specially so as to achieve the purpose of reducing inter-carrier interference. Assuming that the three modulation signals of carries arranged adjacent to each other included in the communication system are respectively expressed as follows:

$$X_1(t+t_1)=A_1(t+t_1)+j*B_1(t+t_1)$$

$$X_2(t+t_2)=A_2(t+t_2)+j*B_2(t+t_2)$$

$$X_3(t+t_3)=A_3(t+t_3)+j*B_3(t+t_3)$$

$t_1$, $t_2$ and $t_3$ are properly selected as the delays of the modulation signals of carriers arranged adjacent to each other respectively, so that the performance indices of these carrier signals can reach the set ones; therefore, each carrier can be well demodulated by the receiver. Through the application of the disclosure, the influence of the inter-carrier interference in the multi-carrier wireless communication system can be greatly reduced. For example, in the multi-carrier CDMA2000 lx EV-DO communication system, the application of the disclosure can greatly improve the effect of each carrier signal being demodulated by the receiver and improve the performance indices and service quality of the communication system.

The point is further described below in conjunction with the accompanying drawings.

Figure 1:
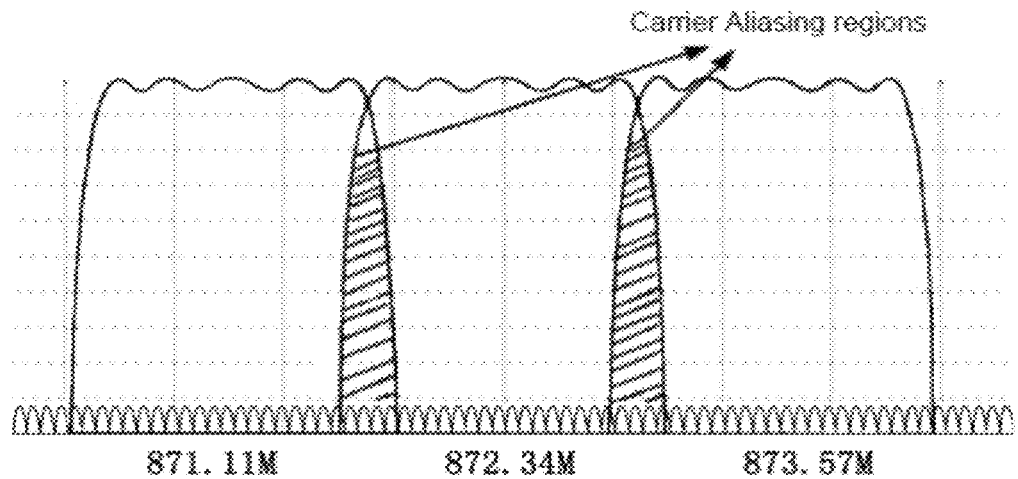
FIG. 1 shows a diagram of carrier interference of three carriers with adjacent frequency domains in a CDMA system.
Figure 2:
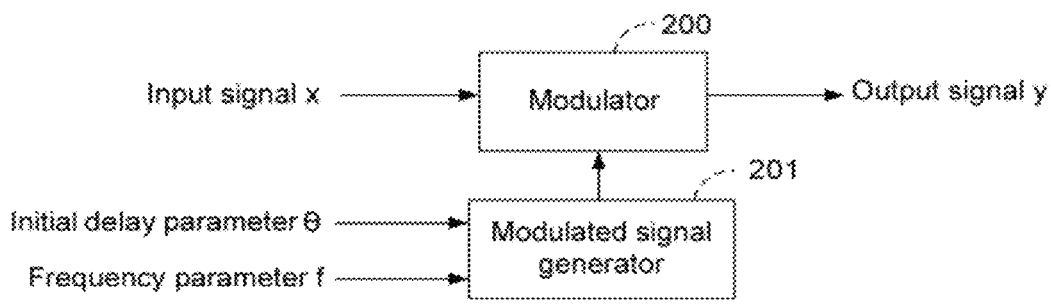
FIG. 2 shows a diagram of a single-carrier modulation mode in the wireless communication system.

FIG. 2 shows a diagram of a single-carrier modulation mode in the wireless communication system. As shown in FIG. 2, there are two components which are a is modulator 200 and a modulation signal generator 201. The modulator 200 is used for modulating the input signal x onto the modulation signal to obtain the output signal y. The input signal is also called baseband signal. The output signal contains a modulated baseband signal, i.e. modulated signal. The modulator 200 is a real number modulator, a complex number debugger or an orthogonal modulator commonly used in the wireless communication system. The modulation signal generator 201 generates the modulation signal according to input parameters. FIG. 2 only shows two input parameters which are frequency parameter f and initial delay parameter θ. The delay of the modulation signal is not particularly appointed according to the parameter of the input signal and the performance indices of the output signal in the conventional modulation mode so as to achieve the purpose of reducing the interference among carriers; therefore, the delay θ in the FIG. 2 is not the function of the input signal x and the output signal y.

Figure 3:
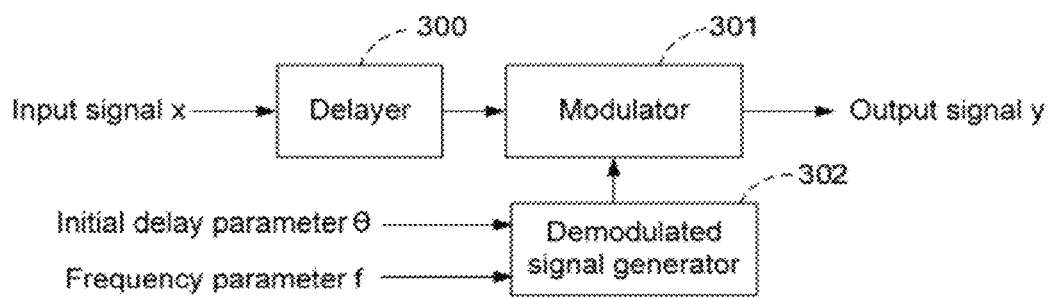
FIG. 3 shows a diagram of a multi-carrier modulation mode in the disclosure.

FIG. 3 shows a diagram of a multi-carrier modulation mode in the disclosure. As shown in FIG. 3, compared with FIG. 2, a delayer 300 is added in order to complete the delay relationship among input signals (modulation signals or baseband signals).

The functions of the modulator 301 and the modulated signal generator 302 in FIG. 3 are completely the same as that of the modulator 200 and the modulation signal generator 201 shown in FIG. 2. The disclosure adopts the modulation mode shown in FIG. 3, and the delay of the modulation signal is selectively set so that the purpose of reducing inter-carrier interference can be achieved.

FIG. 4 shows a flowchart of a method for reducing mutual interference of multi-carrier in the disclosure. As shown in FIG. 4, the method for reducing mutual interference of multi-carrier in the disclosure comprises the following steps.

Step 401, Setting input parameters. These parameters may comprise information parameters representing the input signals (modulation signals or baseband signals) and the parameters of performance indices of the output signals.

Step 402, Extracting the output signals (modulated signals) of the communication system, and computing the performance indices which are used as the basis of selecting the modulation signals.

Step 403, Judging whether the currently used delay meets the requirement according to the difference between the performance indices obtained in Step 402 and the requirement, performing Step 404 when the requirement is not met, and performing Step 405 when the requirement is met.

Step 404, On the basis of the performance indices obtained from the above computing, computing to obtain the next group of initial delays as the new delays of each modulation signal according to optimization algorithm and setting on the modulation signals; repeating Steps 401-404 till obtaining a group of delays which enable the performance indices of the output signals meet the requirement.

Step 405, Fixing the delay obtained finally which is taken as the delay of modulation signal group adopted in specific configuration.

FIG. 5 shows a structural diagram of a parameter selection apparatus in the disclosure. As shown in FIG. 5, the parameter selection apparatus consists of signal extracting hardware and delay selection software. The signal extracting hardware can be a specially designed circuit and also can be a specific or common equipment. The delay selection software can be software running in a Central Processing Unit (CPU) or software running in a programmable logic device or both, and the software also can be fixed and run in a hardware form. Input parameters required by the parameter selection apparatus during operation comprise: the type parameter m of input signals, the signal quantity m of input signals, and the centre frequency information k of input signals. Partial or all input parameters can be used in practical use according to different system or carrier circumstances. The output parameters of the parameter selection apparatus in the disclosure comprise the delay parameter selection result indicating signals of the modulation signals. The result indicating signals represent an operating condition of the parameter selection apparatus, which is end condition or running condition. The parameter selection apparatus in the disclosure works according to the parameter selection method in FIG. 4, which can be used either before or during the operation of the system.

Figure 6:
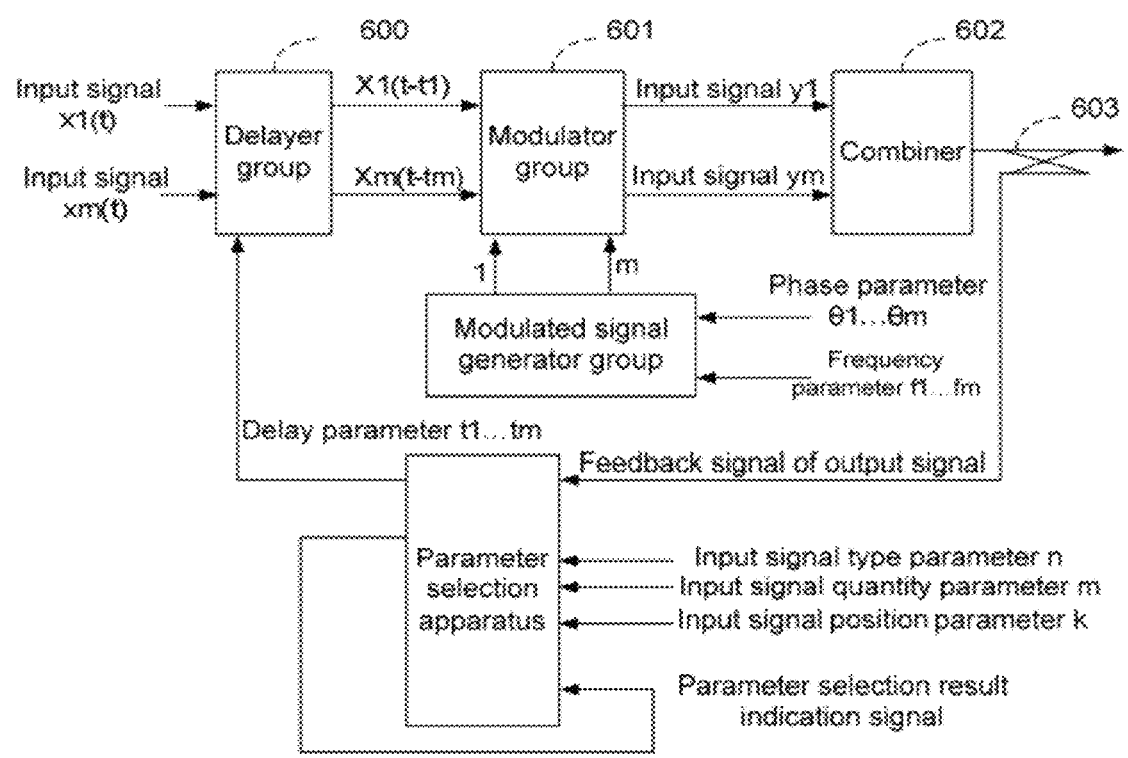
FIG. 6 shows a structural diagram of adjusting the modulation signal by using the parameter selection apparatus in the disclosure.

FIG. 6 shows a structural diagram of adjusting the modulation signal by using the parameter selection apparatus in the disclosure. As shown in FIG. 6, a delayer group 600 is used for setting the size of the delay for each input modulation signal. A modulator group 601 can be various types of modulators adopted in the wireless communication system, which functions in completing the modulation of multi-carrier. The modulator group 601 has two input signals, one of which is input carrier signal, that is, modulation signal X1 . . . Xm, and the other is the modulated signal 1 . . . m output by the modulated signal generator. A combiner 602 is used for combining m modulated single carriers. A coupler 603 is used for feeding back the output signal to the parameter selection apparatus 605 in the disclosure as an input parameter of the parameter selection apparatus 605, based on which together with other input parameters, the parameter selection apparatus 605 selects the delay parameter according to a certain optimization algorithm, and set the selected delay parameter t on each modulation signal through the delayer 600. The function of the parameter selection apparatus 605 is the same as that of the parameter selection apparatus shown in FIG. 5.

The CDMA system of three carriers is taken as an example as follows, and the substance of the technical scheme in the disclosure is further described in combination with the method shown in FIG. 4.

In an embodiment, the screening of the delay is performed on the 1X signal of three carriers arranged adjacent to each other in the CDMA system.

Firstly determining the adopted method and levels of the modulators in which the delay of the modulation signal needs setting. Only the serial number of the modulation signal is given out below for convenient description.

The example completes the screening and setting of the delay just for each input signal of the first-level modulator.

The block diagram of the hardware refers to FIG. 6; the input signal is three carriers, that is, m is 3; and the modulator group comprises three modulators shown in FIG. 3. As shown in FIG. 4, the method for reducing the mutual interference of multi-carrier in the disclosure comprises the following steps.

Step 401, Setting the related parameters required by the parameter selection apparatus, which are respectively as follows: the type of the input carriers, which is 1X in this example; the number of the input carriers, which is three in this example; the centre frequency information of the carriers, the carriers arranged adjacent to each other in this example are set to be 871.11 MHz carrier, 872.34 MHz carrier and 873.57 MHz carrier; and the initial delay of the carrier in this example is obtained through the function of a random sequence generator, and setting the seeds of the generators to be 0 all beginning from the first time. The initial values of the delays of the three carriers obtained through the seed 0 are set in the delayers as the initial delay values of three input adjusting signals and the setting is completed; inputting the requirement of the performance indices of the output signal which is 1X signal in the example, the performance indices comprises: specific value MAX IT of carrier inactivated code channel maximum power and activated code channel total power, which is −27 dBc in the standard requirement (dBc is a unit for representing relative value of power, which is completely the same as the algorithmic method of Db); and the waveform quality Rho, which is 0.912 in the standard requirement.

Step 402, Extracting through the common equipment the corresponding performance indices of the three carriers after the initial delay is set: MAX IT and Rho.

Step 404, Comparing the performance indices obtained in Step 402 with the standard requirement to obtain a difference value as the basis of the selection delay; quitting the screening procedure and entering Step 405 if the standard requirement is met after comparison; or entering Step 403 and beginning to adopt optimization algorithm to perform parameter selection.

The parameter selection algorithm is a continuously recycling process, and the recycle would quit till the selected delay parameter meets the requirement.

Step 403, determining the priority level and step size of the delay adjustment of the modulated signal according to the input parameter in Step 401 and the performance difference value parameter obtained in Step 404.

At first, reference numbers in a downward order are set based on the frequency parameters of the modulated signals in a downward order. For example, the corresponding reference number of 873.57 MHz is 3 in the embodiment, the corresponding reference number of 872.34 MHz is 2, and the corresponding reference number of 871.11 MHz is 1;

The priority level of the delay setting of the input modulation signal is determined according to the signal of the signal centre frequency. If the carriers are arranged adjacent to each other, the modulation signal with smallest reference number has the lowest priority level, followed by the one with the biggest reference number, and the priority levels of the ones with other reference numbers are arranged in order of the reference numbers. If the carries are not arranged adjacent to each other, the reference number of the modulation signal is the priority level, that is, the larger the reference number is, the higher the priority level is. An array arranged from higher to lower in which the priority level and the reference number of adjusting signal are corresponding to each other is obtained after the setting is completed. The priority level corresponding to each reference number in the embodiment is as follows: the reference number 1 corresponds to 1, the reference number 2 corresponds to 2, and the reference number 3 corresponds to 3. The larger the number is, the higher the priority level is.

The step size is divided into two grades according to the difference value quantity of the performance indices of each carrier and the standard requirement computed in Step 404: large step size and small step size. If the difference value of the performance indices obtained in Step 404 is larger than 0.6, the delay is set by using the relatively larger step size, and 0.8 µs is adopted in the embodiment; and if the difference value obtained in Step 404 is smaller than 0.6, the delay is adjusted by using the relatively smaller step size, and the step size adopted in the embodiment is 0.4 µs. After the settings of the step size are completed, an array in which the reference number of the priority level of the delay adjustment and the step size are corresponding to each other can be obtained. The settings of the stepping quantities can be changed dynamically according to the size of the performance difference value. It should be noted that wireless communication systems in different standards respectively have requirements for the delay difference between carriers and the total delays, thus these requirements need to be used as limit parameters for selecting delay.

After the priority level and the step size are obtained, the delay of each modulation signal is set according to the priority level and the step size till optimal performance indices corresponding to the carriers are obtained; then the adjustment is stopped. Here, the judgment basis of the optimization is as follows: if both the increasing and the decreasing of the delay would cause the carrier performance to deteriorate, the very corresponding carrier performance is optimal. After the successive modulations of the delays of all input signals are completed, a delay group which enables each carrier performance to be relatively optimized is obtained, which is called a delay group obtained by the first round adjustment. In the first round, the adjustment is stopped each time the carrier performance of each carrier is checked to be relatively optimized; because of the mutual interference among the carriers for adjusting the relay, each carrier performance does not necessarily meet the standard requirement through the delay obtained in the first round. Checking whether each carrier meets the requirement by using the delay group obtained in the first round adjustment; quitting the adjustment if the requirement is met, or performing the next adjustment round if the requirement is not met.

In the second round adjustment, the phase delay obtained by the first ground adjustment is firstly set and the performance indices of each carrier are extracted; computing the difference value between the obtained performance indices and the required ones; the priority level of the second round delay modulation is set according to the size of the difference value; and the larger the difference value is, the higher the priority level is. The small stepping adjustment, that is, 0.4 µs, is uniformly adopted in the second round adjustment. The performance indices of the corresponding modulation phase carrier are extracted each time a delay is set, and computed to check whether there is any improvement; if there is, the adjustment of the carrier delay is continuous; if there is no improvement, the adjustment of the carrier is stopped and the adjustment of the next carrier is performed. Repeat the procedure till the adjustment of the delays of all carriers is completed, the delay group obtained by the second round adjustment is called a second round delay group.

After the second round adjustment, checking whether each carrier meets the requirement; quitting the adjustment if the requirement is met, or performing a next round adjustment if the requirement is not met. The delay group in which each carrier performance is relatively optimized is obtained by using coarse adjustment manner of large step size and fine adjustment manner of small step size respectively in the first two rounds. In the following adjustment, all carrier performances are observed to check whether each has improvement after each adjustment is completed, and the delay of the corresponding carrier is updated only all carrier performances are improved; or, the delay is not updated, and the priority level is continuously updated according to the size of the difference value; the stepping is progressively reduced continuously by 0.1 μs as difference value, and computing whether the performance of each carrier meets the requirement each time the setting of the delay is completed; quitting the adjustment when the requirement is met, or continuing the next round when the requirement is not met. When the delay stepping is set to be 0 μs is, it shows that no proper delay group could be obtained based on the initial delay generated by the random function generator by using all 0 seeds for the first time in Step 401 to make the carrier performance meet the requirement; at that time, a group of new random number generator seeds have to be updated so as to perform the next search process of repeating the above method.

In the disclosure, besides the random number generator seeds of the first time is a given initial value, which is 0 in the embodiment; the updating of the seeds at other times is to take the delay group in the last round, in which no proper delay is obtained when the delay stepping is 0, as new seeds.

The search is performed circularly according to the above procedure, but the circumstance that proper delay cannot be obtained after the seeds of the random function generator are updated for several times should be avoided so as to prevent software from entering a deal cycle; therefore, the maximum number of times of seed updating is necessarily specified in one search, which is set to be 20 in the embodiment; if the number of times exceeds 20, quitting the search, and it is informed that the search fails. Performing search again after awaiting a period of time till a proper delay is obtained.

It should be noted that the performance indices in the disclosure could also comprise the judgement of the demodulation result of the modulated signal: when the baseband signal (modulation signal) can be correctly demodulated from the modulated signal (output signal), it is considered the performance indices are reached; and when the baseband signal cannot be demodulated from the modulated signal, it is considered that the performance indices are not reached. The demodulation can be performed by the corresponding demodulator, and the demodulation technology and the demodulator can be common demodulator; and the implementing details of demodulation is no longer described here.

Step 405, the delay of the modulation signal is fixed, that is, the delay currently determined is set as the delay of the modulation signal, and the modulated signal is set as an output signal, or, the current modulation signal is set as an input signal.

Figure 7:
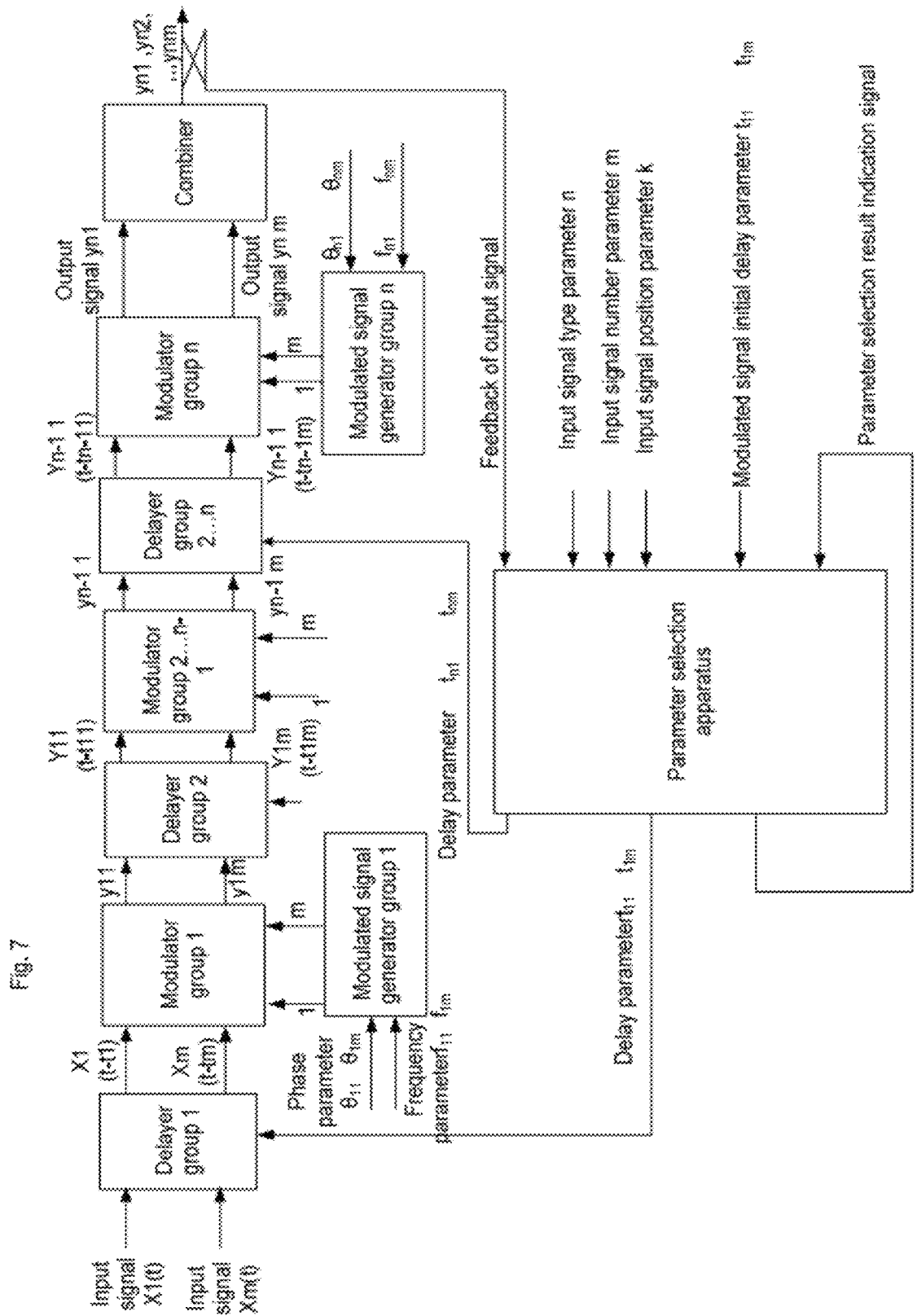
FIG. 7 shows a structural diagram of a processing apparatus for reducing interference used for multi-level modulation of the carrier in the disclosure.

FIG. 7 shows a structural diagram of a processing apparatus for reducing interference used for multi-level modulation of the carrier in the disclosure. As shown in FIG. 7, it is the application of m carriers in n-level modulation. The functions of the delayer and the modulator in the FIG. 7 are completely the same as that of the delayer group and the modulator group shown in FIG. 6, and the modulator of each level is used for modulating the corresponding modulation signal onto the demodulated signal. When in multi-level modulation, the one-level or multi-level delay can be selectively adjusted. In the disclosure, the adjustment of the delay of the modulation signal when in multi-level modulation is described. On the whole, the implementing means of the delay adjustment of the modulation signal when in multi-level modulation is completely the same as that of the delay adjustment of the modulation signal in single-level, and the difference is that whether to complete the adjustment is determined by judging whether the modulated signals output last reach the set performance indices; and the modulation signal determined in each level is set as the input baseband signal of each step after the modulated signals output finally reach the set performance indices.

When the modulation mode of the modulation signal is cascade modulation, the delay of the corresponding modulation signal is adjusted progressively beginning from the corresponding modulation signal of the first level modulation until the performance indices of modulated signals output in the last level reach the set performance indices, and the modulation signal determined in each-level modulation is set as an input baseband signal, wherein the adjustment method is basically the same as that shown in FIG. 4, but the judgement standard is different.

Another example aims at the delay screening of the EV-DO signals of three carriers arranged adjacent to each other in the CDMA system. The method and the steps for delay adjusting is the same as that of the 1X signals of three carriers, and the difference is the indices requirement of the output signal in Step 401. The indices of measuring EV-DO signal comprises: the corresponding waveform quality Rho1 of pilot channel, the corresponding waveform quality Rho2 of MAC channel, the corresponding waveform quality Rho3 of DATA channel, the corresponding MAX IT1 of pilot channel, the corresponding MAX IT2 of MAC channel, and the corresponding MAX IT3 of DATA channel.

Another example is the mixed configuration of EV-DO signals of two carriers and 1X signal of one carrier arranged adjacent to each other in the CDMA system. Different from that of the two previous examples, the configuration of this example is that the configuration of the priority level is further slightly changed in Step 403 besides the performance indices of 1X and EV-DO are simultaneously input in Step 401.

In mixed configuration mode, the EV-DO signal and the 1X signal are respectively distinguished, which are divided into two pure EV-DO and pure 1X signal groups. The priority level of the adjustment delay is respectively set for the two groups of signals according to the method of the previous example, and the priority level is adjusted again according to the principle that the priority level of EV-DO is always higher than that of 1X after the setting is completed, and finally the priority level under the mixed mode is obtained.

For the wireless communication system in other modes, the performance indices parameter corresponding to the signal needs to be changed according to the standard requirement of different modes, while other steps are the same.

Figure 8:
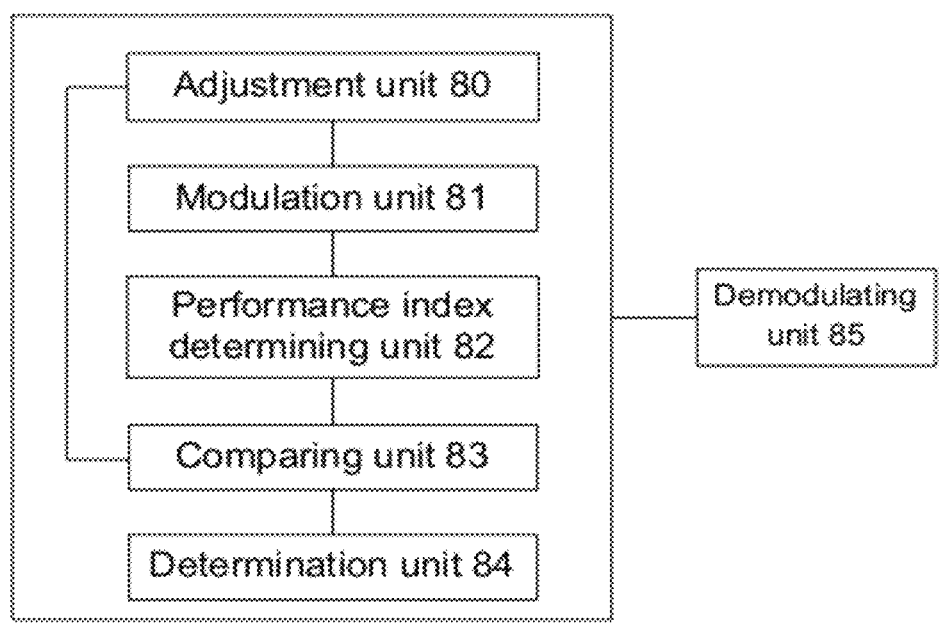
FIG. 8 shows a structural diagram of an apparatus for reducing mutual interference of multi-carrier in the disclosure.

FIG. 8 shows a structural diagram of an apparatus for reducing mutual interference of multi-carrier in the disclosure As shown in FIG. 8, the apparatus for reducing mutual interference of multi-carrier in the disclosure comprises an adjusting unit 80, a modulating unit 81, a performance index determining unit 82, a comparing unit 83 and a determining unit 84. The adjusting unit 80 is used for adjusting the delay of at least one modulation signal; the modulating unit 81 is used for modulating each adjusted modulation signal onto respective modulated signal; the performance index determining unit 82 is used for determining the performance indices of modulated signals; the comparing unit 83 is used for comparing the performance indices of modulated signals with set performance indices, and triggering adjusting unit 80 to further adjust the delay of at least one modulation signal in the modulation signals when the set performance indices are not reached till the performance indices of modulated signals reach the set performance indices, and triggering the determining unit 84 when the set performance indices are reached; and the determining unit 84 is used for setting each current modulated signal as an output signal or an input signal. The adjusting unit 80 is used for simultaneously adjusting the delay of the modulation signal of each carrier. The adjusting unit 80 is used for adjusting the modulation signals of each carrier in sequence. The performance indices of the signal comprise at least one of the specific values MAX IT of carrier inactivated code channel maximum power and activated code channel total power, and waveform quality Rho.

When the modulation mode of the modulation signal is cascade modulation, the adjusting unit 80 adjusts the delay of the corresponding modulation signal progressively beginning from the corresponding modulation signal of the first level modulation until the comparing unit 83 determines that the performance indices of modulated signals output in the last level reach the set performance indices, and the determining unit 84 sets each modulation signal determined in each-step modulation as an input baseband signal.

As shown in FIG. 8, the apparatus for reducing mutual interference of multi-carrier in the disclosure further comprises a demodulating unit 85 configured for demodulating the modulated signals, wherein the performance indices of the signal further comprise whether the modulation signal demodulated by the demodulating unit 85 to be correct, the adjusting unit 80 further adjusts the delay of at least one modulation signal in the modulation signals when there is a incorrect modulation signal, and the determining unit 84 sets each current modulation signal as an input baseband signal when all modulation signals are correct.

Those skilled in the art should understand that the apparatus for reducing mutual interference of multi-carrier shown in FIG. 8 is designed in order to realize the above method for reducing the mutual interference of multi-carrier; the practical function of each processing unit in the apparatus shown in FIG. 8 can be understood with the reference to the related description in the above method for reducing mutual interference of multi-carrier, and the function of each unit can be realized through program running on the processor and also can be realized through the corresponding logic circuit.

The above is only the preferred embodiment of the disclosure and not intended to limit the scope of protection of the disclosure.

The invention claimed is:

1. A method for reducing mutual interference of multi-carrier, comprising:
adjusting a delay of at least one modulation signal;
modulating each adjusted modulation signal onto respective modulated signal; and
comparing performance indices of modulated signals with set performance indices, and adjusting the delay of at least one modulation signal according to a priority level and a step size when the set performance indices are not reached, until the performance indices of modulated signals reach the set performance indices, and setting each current modulated signal as an output signal when the set performance indices are reached,
wherein the priority level is determined according to a number of the modulation signals' frequencies and the modulation signals' positions; the step size is changed dynamically according to difference between the performance indices of modulated signals and the set performance indices.

2. The method according to claim 1, wherein the step of adjusting the delay of at least one modulation signal comprises: adjusting simultaneously the delay of the modulation signal of each carrier.

3. The method according to claim 2, wherein the performance indices of the signal comprise at least one of specific value MAX IT of carrier inactivated code channel maximum power and activated code channel total power, and waveform quality Rho.

4. The method according to claim 3, wherein the performance indices of the signal comprise whether each modulated signal to be correct;
when incorrect modulated signals exist, the delay of at least one modulation signal in the modulation signals is continuously adjusted; when all modulated signals are correct, each current modulation signal is set as an input baseband signal.

5. The method according to claim 1, wherein the step of adjusting the delay of at least one modulation signal comprises: adjusting the modulation signal of each carrier in sequence.

6. The method according to claim 5, wherein the performance indices of the signal comprise at least one of specific value MAX IT of carrier inactivated code channel maximum power and activated code channel total power, and waveform quality Rho.

7. The method according to claim 6, wherein the performance indices of the signal comprise whether each modulated signal to be correct;
when incorrect modulated signals exist, the delay of at least one modulation signal in the modulation signals is continuously adjusted; when all modulated signals are correct, each current modulation signal is set as an input baseband signal.

8. The method according to claim 1, wherein when the modulation mode of the modulation signal is cascade modulation, the delay of the corresponding modulation signal is adjusted progressively beginning from the corresponding modulation signal of the first level modulation until the performance indices of modulated signals output in the last level reach the set performance indices, and each modulated signal determined in each modulation is set as an output signal.

9. The method according to claim 8, wherein the performance indices of the signal comprise at least one of specific value MAX IT of carrier inactivated code channel maximum power and activated code channel total power, and waveform quality Rho.

10. The method according to claim 9, wherein the performance indices of the signal comprise whether each modulated signal to be correct;
when incorrect modulated signals exist, the delay of at least one modulation signal in the modulation signals is continuously adjusted; when all modulated signals are correct, each current modulation signal is set as an input baseband signal.

11. The method according to claim 1, wherein the performance indices of the signal comprise at least one of specific value MAX IT of carrier inactivated code channel maximum power and activated code channel total power, and waveform quality Rho.

12. The method according to claim 11, wherein the performance indices of the signal comprise whether each modulated signal to be correct;
when incorrect modulated signals exist, the delay of at least one modulation signal in the modulation signals is continuously adjusted; when all modulated signals are correct, each current modulation signal is set as an input baseband signal.

13. A method for reducing mutual interference of multi-carrier, comprising:
adjusting a delay of at least one modulation signal;
modulating each adjusted modulation signal onto respective modulated signal; and
comparing performance indices of modulated signals with set performance indices, and adjusting the delay of at least one modulation signal according to a priority level and a step size when the set performance indices are not reached, until the performance indices of modulated signals reach the set performance indices, and setting each current modulated signal as an input signal when the set performance indices are reached, wherein the priority level is determined according to a number of the modulation signals' frequencies and the modulation signals' positions; the step size is changed dynamically according to difference between the performance indices of modulated signals and the set performance indices.

14. An apparatus for reducing mutual interference of multi-carrier, comprising an adjusting unit, a modulating unit, a performance index determining unit, a comparing unit and a determining unit, wherein:

the adjusting unit is configured to adjust a delay of at least one modulation signal;

the modulating unit is configured to modulate each adjusted modulation signal onto respective modulated signal;

the performance index determining unit is configured to determine performance indices of modulated signals;

the comparing unit is configured to compare the performance indices of modulated signals with set performance indices, and trigger the adjusting unit to further adjust the delay of at least one modulation signal in the modulation signals according to a priority level and a step size when the set performance indices are not reached, and trigger the determining unit when the set performance indices are reached; and the determining unit is configured to set each current modulated signal as an output signal, wherein the priority level is determined according to a number of the modulation signals' frequencies and the modulation signals' positions; the step size is changed dynamically according to difference between the performance indices of modulated signals and the set performance indices.

15. The apparatus according to claim 14, wherein the adjusting unit is configured to adjust simultaneously the delay of the modulation signal of each carrier.

16. The apparatus according to claim 15, wherein the performance indices of the signal comprise at least one of specific value MAX IT of carrier inactivated code channel maximum power and activated code channel total power, and waveform quality Rho.

17. The apparatus according to claim 16, further comprising a demodulating unit configured to demodulate the modulated signals, wherein the performance indices of the signal further comprise whether the modulation signal demodulated by the demodulating unit to be correct, the adjusting unit further adjusts the delay of at least one modulation signal in the modulation signals when there is a modulation signal which cannot be demodulated correctly, and the determining unit sets each current modulation signal as an input baseband signal when all modulation signals are demodulated correctly.

18. The apparatus according to claim 14, wherein the adjusting unit is configured to adjust the modulation signals of each carrier in sequence.

19. The apparatus according to claim 18, wherein the performance indices of the signal comprise at least one of specific value MAX IT of carrier inactivated code channel maximum power and activated code channel total power, and waveform quality Rho.

20. The apparatus according to claim 19, further comprising a demodulating unit configured to demodulate the modulated signals, wherein the performance indices of the signal further comprise whether the modulation signal demodulated by the demodulating unit to be correct, the adjusting unit further adjusts the delay of at least one modulation signal in the modulation signals when there is a modulation signal which cannot be demodulated correctly, and the determining unit sets each current modulation signal as an input baseband signal when all modulation signals are demodulated correctly.

21. The apparatus according to claim 14, wherein when the modulation mode of the modulation signal is cascade modulation, the adjusting unit adjusts the delay of the corresponding modulation signal progressively beginning from the corresponding modulation signal of the first level modulation until the performance indices of modulated signals output in the last level reach the set performance indices, and the determining unit sets each modulated signal determined in each modulation as an output signal.

22. The apparatus according to claim 21, wherein the performance indices of the signal comprise at least one of specific value MAX IT of carrier inactivated code channel maximum power and activated code channel total power, and waveform quality Rho.

23. The apparatus according to claim 22, further comprising a demodulating unit configured to demodulate the modulated signals, wherein the performance indices of the signal further comprise whether the modulation signal demodulated by the demodulating unit to be correct, the adjusting unit further adjusts the delay of at least one modulation signal in the modulation signals when there is a modulation signal which cannot be demodulated correctly, and the determining unit sets each current modulation signal as an input baseband signal when all modulation signals are demodulated correctly.

24. The apparatus according to claim 14, wherein the performance indices of the signal comprise at least one of specific value MAX IT of carrier inactivated code channel maximum power and activated code channel total power, and waveform quality Rho.

25. The apparatus according to claim 24, further comprising a demodulating unit configured to demodulate the modulated signals, wherein the performance indices of the signal further comprise whether the modulation signal demodulated by the demodulating unit to be correct, the adjusting unit further adjusts the delay of at least one modulation signal in the modulation signals when there is a modulation signal which cannot be demodulated correctly, and the determining unit sets each current modulation signal as an input baseband signal when all modulation signals are demodulated correctly.

26. An apparatus for reducing mutual interference of multi-carrier, comprising an adjusting unit, a modulating unit, a performance index determining unit, a comparing unit and a determining unit, wherein:

the adjusting unit is configured to adjust a delay of at least one modulation signal;

the modulating unit is configured to modulate each adjusted modulation signal onto respective modulated signal;

the performance index determining unit is configured to determine performance indices of modulated signals;

the comparing unit is configured to compare the performance indices of modulated signals with set performance indices, and trigger the adjusting unit to further adjust the delay of at least one modulation signal in the modulation signals according to a priority level and a step size when the set performance indices are not reached, and trigger the determining unit when the set performance indices are reached; and the determining unit is configured to set each current modulated signal as an input signal, wherein the priority level is determined according to a number of the modulation signals' frequencies and the modulation signals' positions; the step size is changed dynamically according to difference between the performance indices of modulated signals and the set performance indices.

* * * * *